B. L. CALKINS.
HACK SAW MACHINE.
APPLICATION FILED MAY 21, 1920.

1,437,225.

Patented Nov. 28, 1922.
2 SHEETS—SHEET 1.

Inventor
Bert L. Calkins

By Whittemore Hulbert & Whittemore
Attorneys

B. L. CALKINS.
HACK SAW MACHINE.
APPLICATION FILED MAY 21, 1920.
1,437,225.
Patented Nov. 28, 1922.
2 SHEETS—SHEET 2.
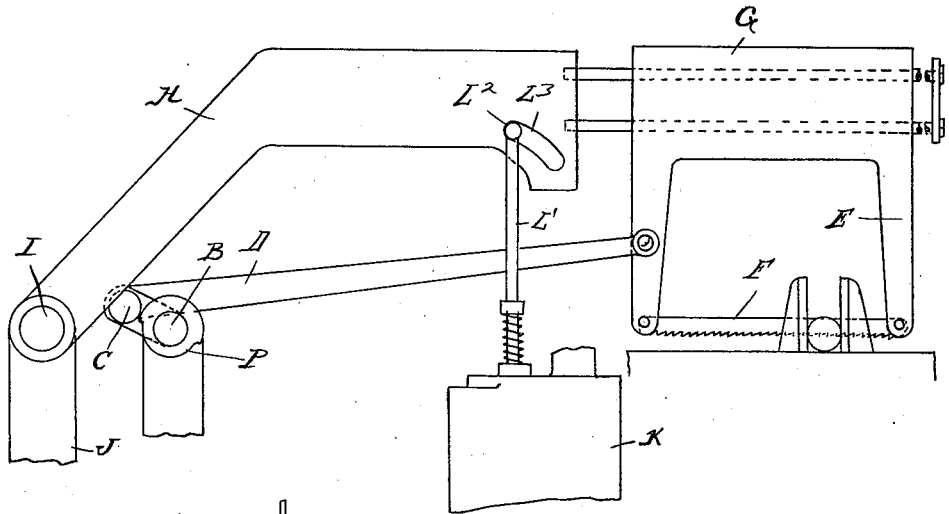
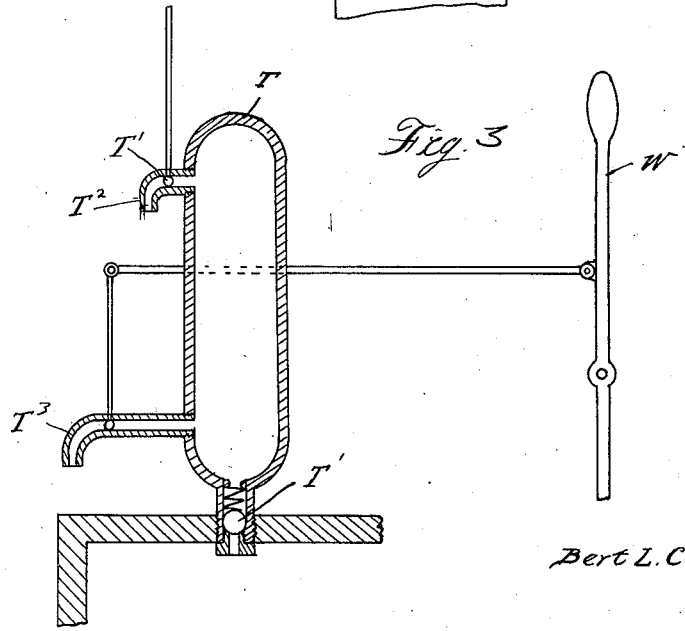
Inventor
Bert L. Calkins
By Whittemore Hulbert & Whittemore
Attorneys Patented Nov. 28, 1922.

1,437,225

UNITED STATES PATENT OFFICE.

BERT L. CALKINS, OF RACINE, WISCONSIN.

HACK-SAW MACHINE.

Application filed May 21, 1920. Serial No. 383,097.

*To all whom it may concern:*

Be it known that I, BERT L. CALKINS, a citizen of the United States of America, residing at Racine, in the county of Racine and State of Wisconsin, have invented certain new and useful Improvements in Hack-Saw Machines, of which the following is a specification, reference being had therein to the accompanying drawings.

The invention relates to hack saw machines and similar machines of that type in which the reciprocating frame that the carries the saw blade or other cutting tool is fed towards the work during the forward or cutting stroke thereof and is relieved from pressure and is lifted to clear the teeth from the work during the return stroke. Among the objects of the invention are; first, the obtaining of a constant rate of feed of the saw blade to and through the work at a constant pressure under uniform resistance; second, the variation in pressure to correspond with increasing or decreasing cross-section of the work; third, the retraction of the blade to clear the work during the return or non-cutting stroke; fourth, the accomplishment of these effects by a hydraulic unit. With these objects in view the invention comprises the novel construction as hereinafter set forth.

In the drawings:

Figure 2 is a longitudinal section showing the hydraulic feeding and controlling mechanism;

Figure 3 is an enlarged section through a portion of the apparatus.

Figure 1:
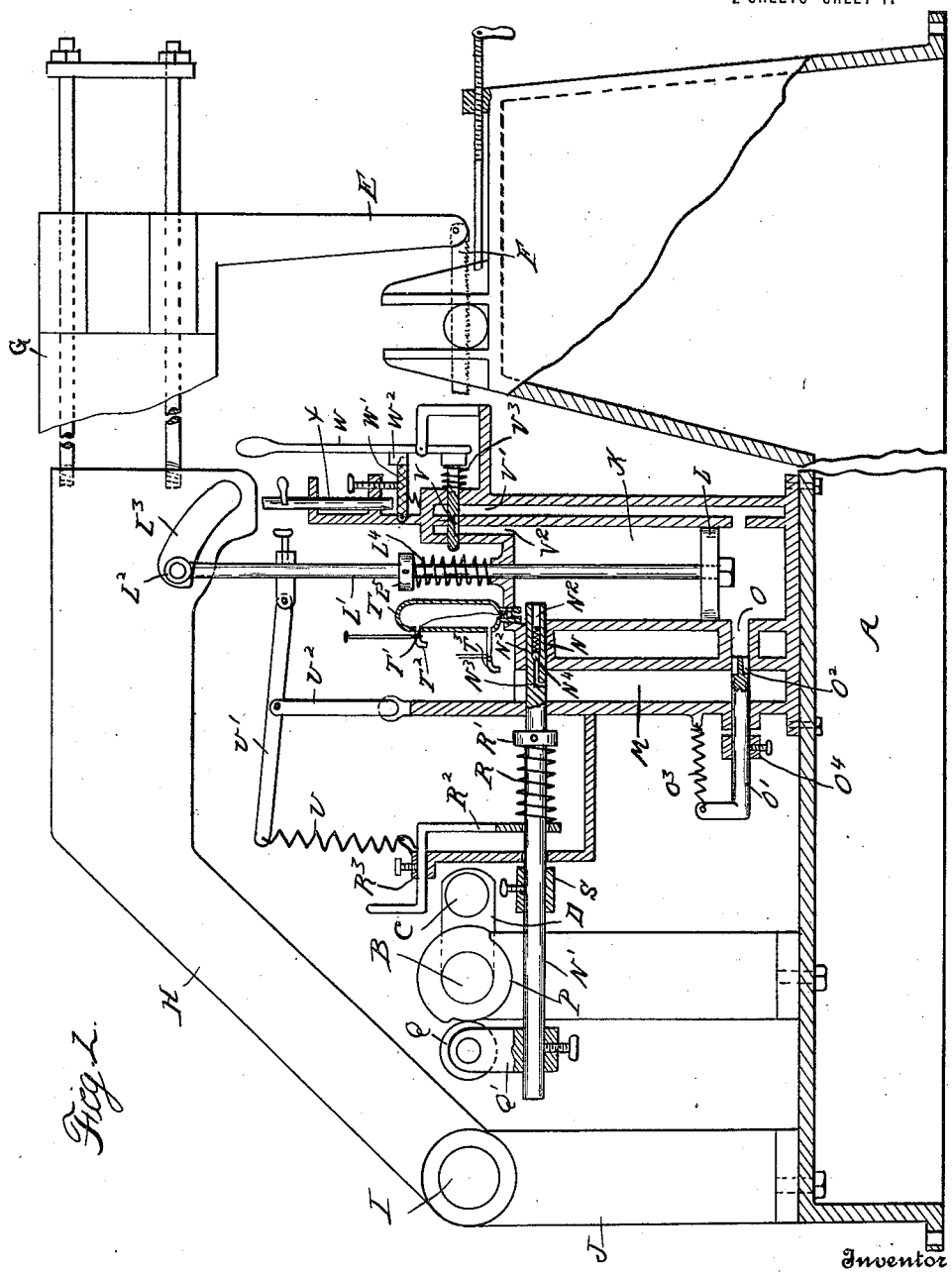
Figure 1 is a diagrammatic side elevation of a hack saw machine, to which my improvements are applied.

A is a suitable bed on which is mounted the crank shaft B having the crank C thereof connected by a rod D with the reciprocating frame E for holding the hack saw blade F. The frame E is slidably mounted on guide bearings G upon a rockable frame H pivotally secured at I to a standard J rising from the bed. This frame H is moved to carry the hack saw towards or from the work by a hydraulic mechanism of the following construction:

K is a cylinder containing a piston L having a rod L' extending upward therefrom and connected to the frame H by suitable means, such as the roller bearing L$^2$ on the rod engaging a slot L$^3$ in the frame. The slot L$^3$ provides a bearing surface for the roller bearing L$^2$ for operating the frame H, and is elongated to provide clearance for the angular movement of the frame H about the pivot I. M is an outer receptacle surrounding or at one side of the cylinder K and containing a supply of the fluid which is used in said cylinder. N and O are cylindrical passages which respectively connect the chambers within the cylinder K on opposite sides of the piston with the receptacle M, and N' and O' are plungers in said cylindrical passages. The plunger N' is actuated in timed relation to the reciprocation of the frame E, preferably by a cam P arranged upon the crank shaft and engaging a roller Q mounted in the adjustable collar Q' on said plunger. Movement of the plunger in the reverse direction is effected by a spring R sleeved thereon, one end abutting against a collar R' adjustably secured to the plunger, and the other end abutting against a member R$^2$ which is adjustable in a bearing R$^3$ on the stationary frame. The plunger N' controls a passage N$^2$, preferably formed within the plunger itself, and connecting the chamber within the cylinder K with the receptacle M. This passage includes a laterally opening port N$^3$ in the plunger, which, when the plunger is at the inner end of its stroke, may or may not be sealed by being located within the cylindrical passage N, but during the outward movement of the plunger, said port N$^3$ will register with the receptacle M so as to establish communication between this receptacle and the cylinder K. The check valve N$^4$ permits the flow of fluid through the port N$^2$ from the receptacle M into the cylinder K, but prevents any reverse flow.

The plunger O' is also provided with a passage O$^2$ therein, which, when the plunger is at the inner end of its stroke, is sealed within the cylindrical passage O, but when said plunger is moved outward, will establish communication between the cylinder K and the receptacle M. O$^3$ is a spring for actuating the plunger O' inward, and O$^4$ is an adjustable stop on the plunger for limiting its inward movement.

With the construction as thus far described, the rotation of the cam P in cooperation with the spring R will cause the reciprocation of the plunger N' and the movement is so timed with the reciprocation of the frame E that the plunger N' will be moved inward in relation to the cylinder K during the cutting stroke of the saw and will be moved outward during or just preceding the return stroke. The inward movement of the plunger N', which is effected by the pressure of the spring R, will cause a displacement of fluid above the piston L, which will effect a downward movement of said piston, thereby drawing down the rod L' and rocking downward the frame H. The amount of movement is determined by the setting of a stop S on the plunger N' and this is so adjusted as to give just the desired feed for the cut. The downward movement of the piston L will displace liquid from the chamber below said piston, which will be forced out through the passages O and $O^2$ into the receptacle M. Upon the further movement of the cam P the plunger N' will be actuated in the reverse direction, outward from the cylinder K. This, by relieving pressure of the fluid in said cylinder above the piston, will permit the pressure of the spring $O^3$ exerted on the piston O' and from the latter upon the fluid below the piston L to raise said piston a sufficient distance to provide proper clearance for the saw during its return stroke. The amount of this lifting of the piston is determined by the setting of the stop $O^4$ and after the limit is reached, the further outward movement of the piston N' will cause the flow of fluid through the passage $N^2$ from the receptacle M into the cylinder K above the piston. Thus when, during the succeeding inward stroke of the plunger N', the additional fluid within the cylinder K above the piston will cause a further depression of the piston or a further downward feeding of the saw, and this operation is continued until the work is completely severed by the saw.

The operation as above described will effect a uniform feeding of the saw into the work on its cutting stroke and a uniform clearance for the saw upon its return stroke. It is, however, desirable that the feeding pressure should be varied according to the cross-section which is being cut. For instance, if the saw is used to sever a bar of round stock, the cross-section will progressively increase in length from the beginning of the cut to half-way through the stock and will then progressively diminish until the stock is completely severed. I have provided means for varying the pressure corresponding to the variation in cross-section and preferably of the following construction;

T is an air chamber connected with the cylinder K and having a check valve T' in the connecting port, which permits the escape of fluid from the cylinder into said chamber, but prevents the return. During the initial feeding movement, a portion of the fluid displaced by the plunger N' during its initial movement will pass by the check valve T' and into the chamber T, thereby lessening the feeding pressure of the saw upon the work. As the chamber T fills up with the displaced fluid, the pressure of the air therein constantly rises until finally it will prevent further ingress of the fluid. This, therefore, will have the effect of progressively increasing the pressure of the saw upon the work from the beginning of its cut until it reaches a full bearing. The reverse action of diminishing the pressure as the saw approaches the completion of its cut is accomplished by placing upon the rod L' a spring $L^4$ engaging a stationary abutment and a collar $L^5$ on said rod. Thus as the piston L is fed downward, the collar $L^5$ will come into contact with the spring $L^4$ and in the further downward movement, the tension of this spring will be increased progressively and will re-act to oppose the downward pressure of the piston L, so that the pressure of the saw on the work will be diminished.

Where the machine is used for cutting work to irregularly varying cross-section, variation of the pressure may be accomplished by manual adjustment, as, for instance, by providing the chamber T with a fluid escape cock $T^2$ which may be adjusted to permit a slight escape of the fluid and thereby diminish the pressure and feeding rate as desired. The chamber T is also provided with an air cock $T^3$ which, when open in conjunction with the valve $T^2$, will drain the liquid from the chamber T and thus secure an air supply as desired.

Upon the completion of the downward feeding movement through the work, it is desirable to provide means for automatically returning the saw ready for engagement with new work. This is accomplished by a trip mechanism, which opens a by-pass around the piston L between the chambers on opposite sides thereof in cooperation with a spring U for moving the piston and rod L' upward. As shown, the spring U is attached to a lever U' fulcrumed upon a link $U^2$ and having its opposite end connected to the rod L'. The trip mechanism for opening the by-pass comprises a by-pass valve V for normally closing the by-pass port, this being arranged between passages V' and $V^2$ connecting respectively with the chambers on opposite sides of the piston. The valve V is connected to a lever W, which is normally locked from movement by a latch W' engaging a stop $W^2$. This latch is disengaged by a rod X which extends into the path of the downwardly moving frame H. The arrangement is such that just at the completion of the varying cut, the frame H bearing upon the rod X will trip the latch W', permitting a spring $V^3$ to open the valve V and by-pass the fluid. Thereupon the tension of the spring U operating through the lever U' and rod L' will raise said rod and frame H ready for another operation.

What I claim as my invention is:

1. The combination with a reciprocating cutting tool, of hydraulic means for feeding the same, comprising a cylinder, a piston in said cylinder, a connection between said piston and said reciprocating cutting tool for feeding the latter towards the work, means for displacing the fluid in said cylinder on one side of said piston to operate the piston, means for introducing into said cylinder on the same side of said piston successive predetermined volumes of fluid to cause said displacing means to advance the piston step by step, means connected to said cylinder on the opposite side of said piston, permitting the displacement therefrom of equal volumes of fluid, and means for re-introducing into the cylinder a portion of the displaced volume and thereby displacing a corresponding amount of fluid from the first-mentioned side of the piston.

2. The combination with a reciprocating cutting tool, of hydraulic means for feeding the same, comprising a cylinder, a piston therein, a connection between said piston and tool for applying and relieving pressure on the latter towards the work, means for displacing the fluid in said cylinder to actuate said piston, means for introducing into the cylinder on one side of said piston successive predetermined volumes of fluid to cause a step-by-step advancement of said piston, means permitting the displacement of an equal volume of fluid from the cylinder on the opposite side of the piston, and means for yieldably resisting the displacement of said fluid and for re-introducing a portion of each displaced volume upon relief of pressure on the fluid in the cylinder on the opposite side of said piston, and means for relieving said pressure during the non-cutting stroke, whereby pressure on the tool is simultaneously relieved.

3. The combination with a reciprocating cutting tool, of hydraulic means for feeding the same, comprising a cylinder, a piston therein, means for applying pressure to the tool connected with said piston, a receptacle for a supply of fluid under atmospheric pressure, means for successively introducing into said cylinder on one side of said piston predetermined volumes of fluid derived from said receptacle, means on the opposite side of said piston for displacing a corresponding volume of fluid into said receptacle, means for re-introducing a portion of the displaced fluid during the non-cutting stroke of the tool and for displacing a corresponding volume from the cylinder on the first-mentioned side of the piston.

4. The combination with a reciprocating cutting tool, of hydraulic feeding means therefor comprising a cylinder, a piston therein, and means operated by said piston for applying pressure to said tool during its cutting stroke, a receptacle for fluid under atmospheric pressure, a plunger moving in a passage between said receptacle and cylinder on one side of the piston for successively displacing predetermined volumes of fluid and actuating said piston step-by-step; a second plunger operating in a passage between said cylinder on the opposite side of said piston and said receptacle, resilient yieldable means for pressing said second plunger towards said cylinder, a stop for limiting the movement of said plunger in its passage, whereby the fluid displaced by said piston will be forced through the passage against the resistance of said plunger into said receptacle, and a portion of said volume will be re-introduced into the cylinder to move the piston oppositely, means for reciprocating said first-mentioned plunger, and means operating during said reciprocation for admitting into said cylinder on the first-mentioned side of the piston a volume of fluid equal to that permanently displaced from the opposite side of said piston.

5. The combination with a reciprocating cutting tool, of hydraulic feeding means therefor comprising a cylinder, a piston therein, and means operated by said piston for applying pressure to the tool, means for applying a yieldable force to said piston in a direction to relieve pressure upon said cutting tool, means for displacing the fluid in said cylinder on one side of the piston to actuate said piston, means for successively introducing into said cylinder on the same side of the piston predetermined volumes of fluid to cause a step-by-step advancement of said piston in a direction to apply pressure to the work, means permitting the displacement of a corresponding volume of fluid from the opposite side of said piston, and means operating at the completion of the cutting operation for opening a by-pass between the chambers in said cylinder on opposite sides of the piston, whereby the constantly applied pressure will return the piston to its initial position.

6. The combination with a reciprocating cutting tool, of hydraulic means for feeding the same, comprising a cylinder, a piston therein, means operated by said piston for applying pressure against said tool, a receptacle for fluid under atmospheric pressure, means operated below the level of the fluid in said receptacle for successively introducing into said cylinder on one side of said piston predetermined volumes of fluid derived from said receptacle, means permitting the displacement of corresponding volumes of fluid from the cylinder on the opposite side of the piston into said receptacle, and means for re-introducing a portion of the displaced volume to move said piston in the opposite direction and to relieve pressure upon said tool during the non-cutting stroke.

7. The combination with a reciprocating cutting tool, of hydraulic means for feeding the same, comprising a cylinder, a piston therein, means operated by said piston for applying pressure against said tool, means for displacing the fluid in said cylinder on one side of said piston to actuate the piston, means for successively introducing into said cylinder on the same side of the piston predetermined volumes of fluid to cause a step-by-step advancement of said piston, means permitting the displacement of an equal volume of fluid from the cylinder on the opposite side of the piston, and means for reintroducing into the cylinder on said opposite side of the piston a portion of the displaced fluid to actuate said piston in the opposite direction, thereby relieving the pressure and retracting the cutting tool during the non-cutting stroke.

8. The combination with a reciprocating cutting tool, of hydraulic means for feeding the same, comprising a cylinder, a piston therein, means operated by said piston for applying pressure against said tool, means for displacing the fluid in said cylinder on one side of said piston to actuate the piston, means for successively introducing into said cylinder on the same side of the piston predetermined volumes of fluid to cause a step-by-step advancement of said piston, means permitting the displacement of an equal volume of fluid from the cylinder on the opposite side of the piston, means for reintroducing into the cylinder on said opposite side of the piston a portion of the displaced fluid to actuate said piston in the opposite direction, thereby relieving the pressure and retracting the cutting tool during the non-cutting stroke, and manually adjustable means for regulating the amount of displacement of the fluid to reduce the weight of feed and the feeding pressure of the cut during any part of the operation.

In testimony whereof I affix my signature.

BERT L. CALKINS.